United States Patent
Bech et al.

(10) Patent No.: US 10,156,226 B2
(45) Date of Patent: Dec. 18, 2018

(54) WIND TURBINE BLADE AND METHOD OF MANUFACTURING A WIND TURBINE BLADE

(71) Applicant: Vestas Wind Systems A/S, Aarhus N. (DK)

(72) Inventors: Anton Bech, Ringkøbing (DK); Henrik Aarup, Holstebro (DK); Michael Heuer, Hvide Sande (DK); Sönke Harders, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 797 days.

(21) Appl. No.: 14/369,928

(22) PCT Filed: Dec. 14, 2012

(86) PCT No.: PCT/DK2012/050470
§ 371 (c)(1),
(2) Date: Jun. 30, 2014

(87) PCT Pub. No.: WO2013/097855
PCT Pub. Date: Jul. 4, 2013

(65) Prior Publication Data
US 2014/0341738 A1    Nov. 20, 2014

Related U.S. Application Data

(60) Provisional application No. 61/581,654, filed on Dec. 30, 2011.

(30) Foreign Application Priority Data

Dec. 29, 2011    (DK) .................................. 2011 70764

(51) Int. Cl.
F03D 9/00        (2016.01)
F03D 80/30      (2016.01)
(Continued)

(52) U.S. Cl.
CPC ........... *F03D 80/30* (2016.05); *F03D 1/0675* (2013.01); *H02G 13/00* (2013.01);
(Continued)

(58) Field of Classification Search
CPC .... F03D 11/0033; F03D 1/0675; F03D 80/30; F05B 2240/30; F05B 2250/61; F05B 2250/611
(Continued)

(56) References Cited

U.S. PATENT DOCUMENTS 4,583,702 A * 4/1986 Baldwin .................. H01Q 1/42
                                                            244/1 A
6,457,943 B1    10/2002 Olsen et al.
(Continued)

FOREIGN PATENT DOCUMENTS

| JP | 2004245174 A | 9/2004 |
|---|---|---|
| JP | 2007100658 A | 4/2007 |
| WO | 2011080177 A1 | 7/2011 |

OTHER PUBLICATIONS

European Patent Office, extended European Search Report issued in Application No. 15170156.2 dated Sep. 30, 2015.
(Continued)

*Primary Examiner* — Dwayne J White
*Assistant Examiner* — Jason Mikus
(74) *Attorney, Agent, or Firm* — Wood Herron & Evans LLP

(57)    ABSTRACT

A wind turbine blade comprising a lightning protection system is provided. The lightning protection system comprises a lightning conductor located along a longitudinal portion of the wind turbine blade and is coupled to an electrical ground. A lightning receptor module is arranged on an external surface of the wind turbine blade and electrically coupled to the lightning conductor. An elongate
(Continued)

receptor band is installed on the external surface of the wind turbine blade, over the lightning receptor module, and the receptor band is arranged to receive a stroke of lightning and transfer electrical current from the lightning stroke to the lightning conductor through the lightning receptor module. Further, the elongate receptor band comprises a crease in a longitudinal cross-sectional profile of the elongate receptor band. A method of installing a lightning protection system on a wind turbine blade is further provided.

14 Claims, 5 Drawing Sheets

(51) Int. Cl.
    *F03D 1/06*     (2006.01)
    *H02G 13/00*     (2006.01)

(52) U.S. Cl.
    CPC ....... *F05B 2240/30* (2013.01); *F05B 2250/61* (2013.01); *F05B 2250/611* (2013.01); *Y02E 10/721* (2013.01); *Y02P 70/523* (2015.11); *Y10T 29/49336* (2015.01)

(58) Field of Classification Search
    USPC ...................................................... 416/169 R
    See application file for complete search history.

(56) References Cited

U.S. PATENT DOCUMENTS

| | | | |
|---|---|---|---|
| 2004/0130842 A1 | 7/2004 | Johansen et al. | |
| 2007/0230085 A1* | 10/2007 | Le ......................... | B64D 45/02 361/212 |
| 2007/0253827 A1* | 11/2007 | Dahl ...................... | B64D 45/02 416/230 |
| 2008/0181775 A1 | 7/2008 | Livingston et al. | |
| 2010/0264665 A1* | 10/2010 | Hebert ................... | B64C 1/12 290/55 |
| 2010/0280797 A1 | 11/2010 | Erichsen | |
| 2011/0182731 A1* | 7/2011 | Naka ...................... | F03D 80/30 416/1 |

OTHER PUBLICATIONS

International Bureau, Notification Concerning Transmittal of International Preliminary Report on Patentability, issued in corresponding International Application No. PCT/DK2012/050470, dated Jul. 1, 2014, 10 pages.
International Searching Authority, International Search Report and Written Opinion issued in corresponding PCT Application No. PCT/DK2012/050470 dated Nov. 9, 2013, 16 pages.
Danish Patent and Trademark Office, Combined search and examination report issued in corresponding DK application No. PA 2011 70764 dated Jul. 20, 2012, 5 pages.

* cited by examiner

WIND TURBINE BLADE AND METHOD OF MANUFACTURING A WIND TURBINE BLADE

FIELD OF THE INVENTION

The invention generally relates to a wind turbine blade and a method of manufacturing a wind turbine blade. In particular, the invention relates to a wind turbine blade comprising a lightning protection system.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines may be arranged together to form a wind park or wind power plant.

Lightning strikes are a major cause of concern for wind turbine sustainability. With wind turbines being located in remote areas for the best wind catchment, the turbines are a particularly attractive target for lightning strikes due to their height and material composition.

Wind turbine blades typically encompass advanced lightning protection systems, some of which comprise features such as lightning receptors and a lightning down conductor for conducting lightning to ground to prevent lightning strikes from damaging the wind turbine blade.

SUMMARY OF THE INVENTION

In first aspect of the invention, there is provided a wind turbine blade comprising a lightning protection system, the lightning protection system comprising, a lightning conductor located along a longitudinal portion of the wind turbine blade and being coupled to an electrical ground, a lightning receptor module arranged on an external surface of the wind turbine blade and electrically coupled to the lightning conductor, and an elongate receptor band installed on the external surface of the wind turbine blade, over the lightning receptor module, the receptor band arranged to receive a stroke of lightning and transfer electrical current from the lightning stroke to the lightning conductor through the lightning receptor module, wherein the elongate receptor band comprises a crease in a longitudinal cross-sectional profile of the elongate receptor band.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

Figure 1:
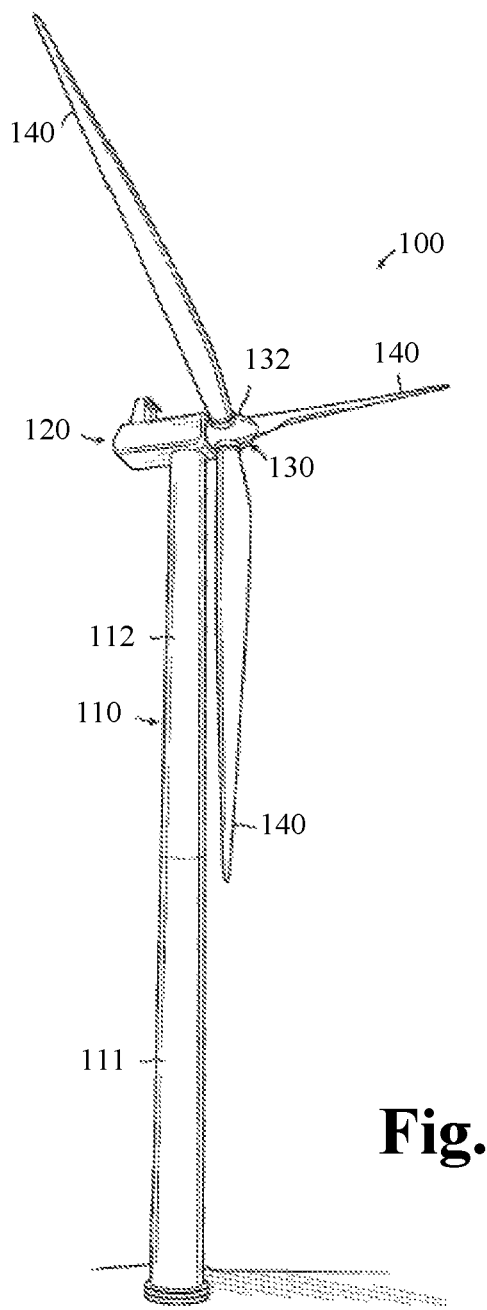
FIG. 1 illustrates a wind turbine.

Before turning to the detailed description of the drawings, a few more general items of the embodiment will be discussed.

An example of a typical lightning protection system is one wherein discrete lightning receptors, which are metallic conductors originating from within the blade shell and terminating at the surface of the blade, are provided as part of the lightning protection system. The discrete lightning receptors are typically made of metal and are supposed to attract any lightning strike attachments to the receptors, and not the wind turbine blade. The discrete lightning receptors are also connected to a lightning down conductor inside the blade, and which couples the lightning receptors to electrical ground.

However, such a lightning protection system has been shown in the field to not be as effective as designed. Studies conducted on erected wind turbines comprising blades with such typical lightning protection systems have shown that the risk of lightning strike attachments to the blade itself is not sufficiently mitigated by the presence of the discrete lightning receptors.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the first aspect, there is provided a wind turbine blade comprising a lightning protection system, the lightning protection system comprising a lightning conductor located along a longitudinal portion of the wind turbine blade and being coupled to an electrical ground, a lightning receptor module arranged on an external surface of the wind turbine blade and electrically coupled to the lightning conductor, and an elongate receptor band installed on the external surface of the wind turbine blade, over the lightning receptor module, the receptor band arranged to receive a stroke of lightning and transfer electrical current from the lightning stroke to the lightning conductor through the lightning receptor module, wherein the elongate receptor band comprises a crease in a longitudinal cross-sectional profile of the elongate receptor band.

The provision of an elongate receptor band increases the attractiveness of the lightning towards the lightning receptor module and improves the effectiveness of the wind turbine blade. Such an elongate receptor band is conductive and increases the surface area of the blade which is presented as part of the lightning protection system. Particularly, the elongate receptor band provides more area by which electrical initial leaders may propagate from the lightning protection system to connect with oppositely charged leaders from a lightning strike and to lead the lightning strike onto the lightning protection system.

Further, by providing an elongate receptor band which comprises variation in its cross-sectional profile, particularly, comprising a crease in its longitudinal cross-sectional profile, offers a measure of flexibility to the elongate receptor band. This is useful as the receptor band is installed on the external surface of the blade, and has to undergo mechanical stresses similar to what the blade is experiencing. Stresses such as blade bending, blade torsion and stretch and strain are examples of the mechanical stresses which the elongate receptor band may experience. Providing flexibility to the elongate receptor band allows for a physically more reliable inclusion to a typical lightning protection system.

In an embodiment, the elongate receptor band comprises an undulating longitudinal cross-sectional profile. In another embodiment, the elongate receptor band comprises an accordion-shaped longitudinal cross-sectional profile. In yet another embodiment, the elongate receptor band comprises a corrugated longitudinal cross-sectional profile.

In an embodiment, the elongate receptor band is installed on the external surface of the wind turbine by an adhesive.

In an embodiment, the elongate receptor band comprises a metal.

In another embodiment, wherein the elongate receptor band comprises any one of: iron, stainless steel, aluminum, and copper.

In an embodiment, the lightning receptor module is a discrete lightning receptor.

In an embodiment, the lightning receptor module comprises two discrete lightning receptors, and the elongate receptor band is installed over both the discrete lightning receptors.

In an embodiment, the elongate receptor band is installed in a substantially longitudinal direction along the wind turbine blade.

A wind turbine is further provided, comprising a wind turbine blade as described above. In the second aspect, there is provided a installing a lightning protection system in a wind turbine blade, the method comprising providing a lightning protection system in the wind turbine blade, comprising a lightning receptor module arranged on an external surface of the wind turbine blade and which is electrically coupled to a lightning conductor, the lightning conductor located along a longitudinal portion of the wind turbine blade and being coupled to an electrical ground; preparing a receptor band for application onto the wind turbine blade, and incorporating the receptor band into the lightning protection system, wherein incorporating the receptor band further comprises removing the lightning receptor module from the wind turbine blade, thereby leaving a receptor recessed hole in the external surface of the wind turbine blade, creating a through-hole in the receptor band which aligns with the receptor recessed hole, applying the receptor band onto the external surface of the wind turbine blade, mounting the lightning receptor module over the receptor band and into the recessed hole via the through-hole in the receptor band, to incorporate the receptor band into the lightning protection system.

In another embodiment, the lightning receptor module is trimmed of any protrusion after the lightning receptor module is mounted over the receptor band.

In an embodiment, preparing the receptor band for application onto the wind turbine blade comprises providing a copper strip for blade lightning protection, providing a strip of expanded copper foil, applying a layer of sealing resin on a first surface of the copper strip, curing the sealing resin to adhere the copper strip to the strip of expanded copper foil in forming the receptor band, and providing a layer of adhesive onto a second surface of the copper foil for application onto the wind turbine blade.

In an embodiment, applying the receptor band onto the wind turbine blade comprises placing the receptor band onto the surface of the blade, holding the receptor band in place on the surface of the blade such that the through-hole in the receptor band is aligned with the receptor recess, applying a vacuum distribution net over the receptor band and creating a vacuum over the receptor band, attaching a heating blanket over the vacuum distribution net and applying heat to activate adhesive on the receptor band, removing the heating blanket and the vacuum distribution net, and applying a sealer to an edge of the applied receptor band.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates an exemplary wind turbine 100 according to an embodiment. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown).

In one embodiment, the blades 140 may have an aerodynamic profile such that, at predefined wind speeds, the blades 140 experience lift, thereby causing the blades to radially rotate around the hub. The hub 132 further comprises mechanisms (not shown) for adjusting the pitch of the blade 140 to increase or reduce the amount of wind energy captured by the blade 140. Pitching adjusts the angle at which the wind strikes the blade 140.

The hub 132 typically rotates about a substantially horizontal axis along the drive shaft extending from the hub 132 to the nacelle 120. The drive shaft is usually coupled to one or more components in the nacelle 120, which are configured to convert rotational energy of the shaft into electrical energy.

Typically, the blade 140 may vary from a length of 20 meters to 60 meters, and beyond. Such blades are precisely manufactured to ensure that the rotor remains balanced for optimum aerodynamic performance. The lightning protection system for use in the wind turbine blade is integrated into the manufacturing process, the end product being that the manufactured blade comprises a fully operable lightning protection system. Blade 140 is formed by a manufacturing process which includes pre-impregnation of composite fibers ("pre-preg"), which is a well-known process and will not be elaborated on. Other manufacturing methods may be used as well.

Figure 2:
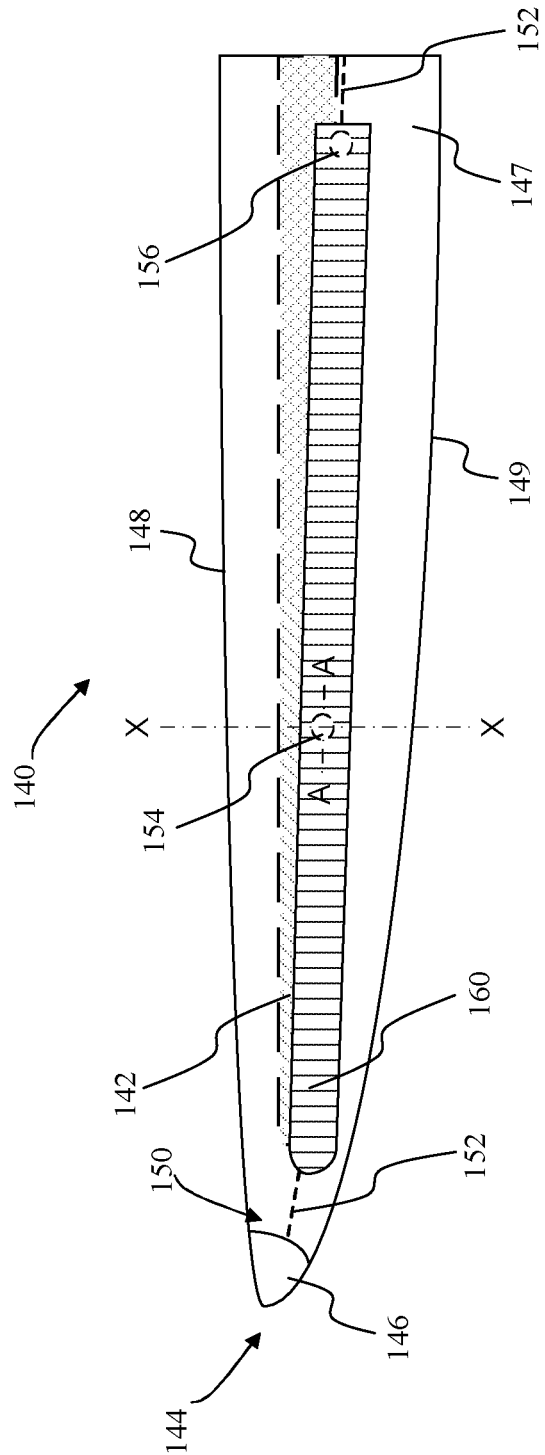
FIG. 2 illustrates a wind turbine blade comprising a lightning protection system according to an embodiment.

FIG. 2 illustrates a portion of a wind turbine blade comprising a lightning protection system according to an embodiment. Blade 140 is a 45 m blade, but may be of any other length in other embodiments. Blade 140 originates in the present embodiment at a blade root (not shown), which may be demarcated as a proximal end of the blade. The blade root is typically a cylindrical section of the blade 140 which tapers to form a load-bearing spar 142 which acts as an internal support for the blade 140. In the manufacturing of blade 140, two opposing blade shells, one forming a windward surface 147 of the blade, the other forming a leeward surface of the blade, are thereafter joined together over the spar to form the blade 140. It is noted that a portion of the blade 140, corresponding to a distal end, extends beyond the spar 142. A layer of dirt-resistive paint, which is typically electrically non-conductive, is further painted over the surface of the blade 140.

The load-bearing spar 142 is substantially rectangular in shape, and is composed of primarily of carbon fiber and epoxy for light-weight but resilient construction. It is also of note that carbon fiber is inherently electrically conductive in nature, and as such, the presence of the spar 142 beneath the surface of the blade 140, formed by the two opposing blade shells, is attractive to a lightning strike.

Blade 140 tapers towards a distal end to form a blade tip 144. Blade tip 144 comprises a tip receptor 146 which takes the shape and form of a typical blade tip and forms a part of a blade lightning protection system 150. Tip receptor 146, being a good electrical conductor, provides for the easy formation and release of electrical leaders and is thus extremely attractive for lightning stroke formation and attraction. In order to provide an effective and durable segment to be incorporated into the blade 140, and which is able to receive and resist multiple lightning strikes, the tip receptor 146 is composed entirely of metal, and in the present embodiment, of copper.

The tip receptor 146 is coupled onto the blade 140 by a nut and bolt securing configuration, but any other means which allows the tip receptor 146 to be securely fastened on the blade 140 may be possible. The tip receptor 146 is also directly fastened, by crimping, to a down conductor (indicated as broken line 152) on the inside of the blade 140. Other methods are possible.

Down conductor 152 runs from the connection with the tip receptor 146 down to the blade root, and thereafter coupled to the nacelle 120 of the wind turbine 100 and on to electrical ground. In running on the inside of the blade 140, the down conductor 152 is coupled onto a side of the spar 142 for support. Down conductor 152 comprises a core of copper wire, in the present embodiment about 50 mm$^2$ in cross-section. High voltage insulation is also provided about the copper core of down conductor 152. In this embodiment, silicone rubber is provided, but any other electrical non-conductor or polymer-type insulation with a high dielectric breakdown voltage may also be used.

Blade lightning protection system 150 further comprises a plurality of side receptors, of which two side receptors 154, 156 are shown in FIG. 2. The side receptors 154, 156 originate from within the blade shell,
where they are electrically coupled to the down conductor 152, and terminate at the surface of the blade 140, where the exposed surface of the side receptor is substantially flush with the surface of the blade. The side receptors may also be known as discrete lightning receptors. The present blade 140 comprises side receptors 154, 154a (see FIG. 3) on both a windward face and a leeward face of the blade, although in some embodiments, the blade may only comprise side receptors on one face, for example the windward face. Side receptors 154, 156 are presently located in the present embodiment on a side of the spar 142 corresponding to a trailing edge 149 of the blade 140. In the present embodiment, side receptors 154 and 156 are located 3 meters apart.

In the present embodiment, the side receptor is circular in shape, and is made of metal, in particular, stainless steel. Other forms of shape, size and material may of course be used to achieve the same purpose.

In the present embodiment, the side receptors are located at a predetermined distance from the tip receptor 146 along the length of the blade 140. In the present embodiment, there are at least 6 side receptors on the blade 140, and the distance between each side receptor is increased towards the root of the blade. The number of receptors and the predetermined distance between each receptor is based on lightning protection studies and may vary in other embodiments.

The function and location of the side receptor is designed for the side receptor to be more electrically attractive to a lightning strike attachment, than the rest of the blade 140. The metallic compositions of the side receptors facilitate the ionization and release of electrical leaders and streamers, which are necessary in lightning strike attachment.

Figure 3:
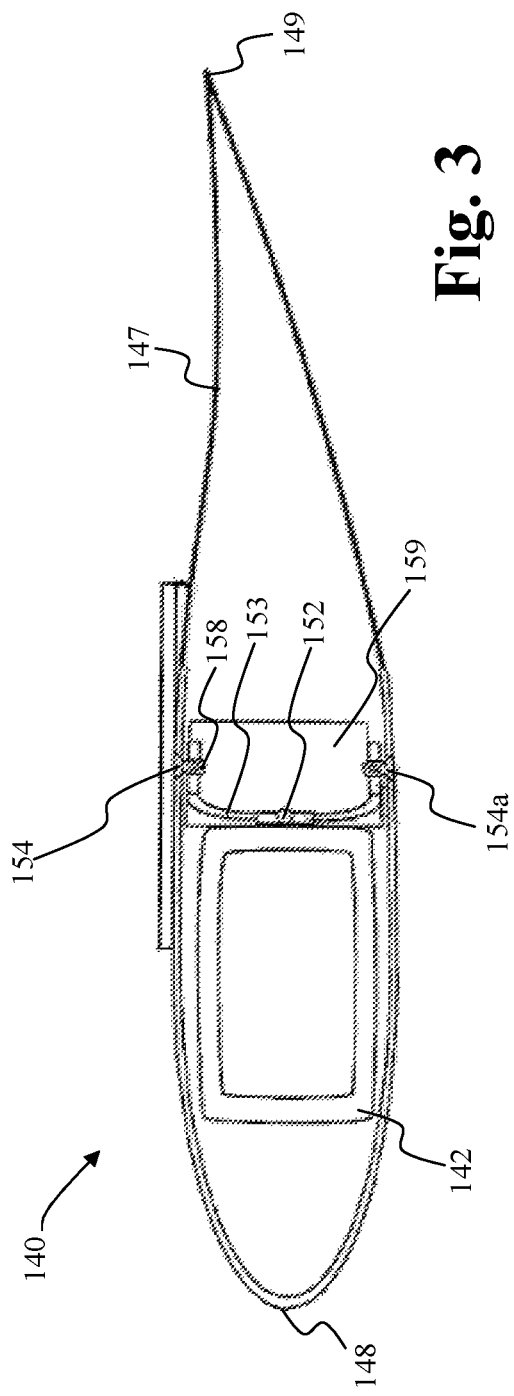
FIG. 3 illustrates a cross-sectional view of the wind turbine blade of FIG. 2.

FIG. 3 illustrates a cross-sectional view of the wind turbine blade of FIG. 2, according to the line X-X. For orientation, the windward surface 147 of the blade 140 is facing upwards, while the leading edge 148 and trailing edge 149 are indicated accordingly. As indicated above, the down conductor 152 is coupled onto a side of the spar 142 for support, and in such configuration, the down conductor 152 runs longitudinally within the blade along-side the spar 142. The side receptor 154 is located adjacent the spar 142.

The side receptor 154 is installed by means of screw formations through the shell of the blade 140 and is secured to a receptor base 158 on the interior of the blade 140. The receptor base 158 is thereafter connected to the down conductor 152 with a braid of copper wires 153. The connection from the down conductor 152 to the copper wire braid 153 is formed with a high quality weld or a pressed connection. The copper wire braid 153 may or may not comprise additional insulation, depending primarily on the distance from the blade tip. Within the blade, the side receptor 154 and the connections to the down conductor 152, are held in place by a foam block 159 comprising low-density polyethylene. In the present embodiment, a corresponding side receptor 154a is provided on the leeward surface of the blade. The foam box also acts as electrical insulation in preventing arcing of lightning current within the blade 140.

Returning back to FIG. 2, in the present embodiment, the blade 140 further comprises an elongate receptor band 160 installed in a substantially longitudinal direction along the wind turbine blade 140. Specifically, receptor band 160 is installed on the windward surface 147 of the blade 140, over the side receptors 154, 156. A function of the receptor band 160 is to improve the effectiveness of the blade lightning protection system 150 by accentuating the attractiveness of the system to a lightning strike attachment by providing a greater surface area for the emission of electrical leaders and for a lightning strike attachment to connect with. Lightning current from a lightning strike attachment on receptor band 160 will be transferred through the receptor band 160 into the side receptor 154, 156, to the down conductor 152 and down to electrical ground.

Receptor band 160 comprises a metal, and in this particular embodiment, copper, due to its good electrical conductivity and relative durability. In other embodiments, any one of iron, stainless steel, aluminum and copper could be instead used.

The receptor band 160 is provided onto the blade 140 near the distal end of the blade 140. This is also identified as the area most likely to be struck by lightning. Receptor band 160 is installed in a substantially longitudinal direction along the wind turbine blade. The receptor band 160 is placed on the surface of the blade 140, where it covers a portion of the internal spar 142.

In particular, the receptor band 160 is placed centrally over the side receptors 154, 156, and in physical and electrical contact with the side receptors. Longitudinally, the receptor band 160 covers the distal end of the spar 142 at one end, by extending past the edge of the spar, and covers the second side receptor 156 at the other. Any other length of the receptor band may of course be provided.

In general, the wind turbine blade 140 is aerodynamically designed to ensure the best performance in capturing the wind to allow a coupled electrical generator to convert the mechanical energy in wind to electrical energy. Further, the blade 140 is precisely manufactured to ensure that the rotor 130 remains balanced in operation. As such, and in view that the receptor band 160 is to be located on the external surface of the wind turbine blade, the receptor band 160 is provided such that it presents as little influence on the aerodynamic profile of the blade 140 as possible. In the present embodiment, the height of the receptor band, measured from the surface of the blade 140, is designed to be at most 2 mm. In a preferred embodiment, the height of the receptor band 160 is 1.5 mm.

Further, the rotation of the blade 140 during operation brings about a high velocity of wind travelling over the windward surface of the blade, and this subsequently causes a high resistive force to act laterally on the receptor band 160. In order not to cause any deviation in the aerodynamic profile once in operation, the receptor band 160 is intended to be a rigid attachment, which should not warp under continuous blade rotation. In the present embodiment, the receptor band 160 comprises a metal band, and in particular a metal band comprising copper.

During operation of the wind turbine 100, the wind turbine 100 is designed to face the direction of the prevailing wind. Rotation of the rotor 130 and the blade 140 during operation brings about a situation wherein mechanical stresses such as a bending or flexing of the blade occurs. The length of the blade compounds the occurrence of blade bending, as the amount of torque increases when the distance from the root of the blade, where it is coupled to the rotor, increases.

The receptor band 160 of the present embodiment is designed to withstand the stresses and strains of an external attachment to the surface of the wind turbine blade 140, and in reducing any adverse aerodynamic effect on operation. Receptor band 160 comprises creases along the length of the receptor band, in particular creases perpendicular to the longitudinal profile of the band 160.

The receptor band is required to maintain physical contact with the side receptors 154, 156 at all times, in order to effectively function as part of the lightning protection system in passing any received lightning current onto the side receptors and on to the down conductor to electrical ground. The presence of such a crease in the receptor band 160 allows for the receptor band to maintain essential contact with the surface of the blade 140 and the side receptors, while at the same time, allowing the receptor band 160 to withstand the physical stresses of constant blade bending without buckling or cracking due to fatigue stress.

Figure 4:
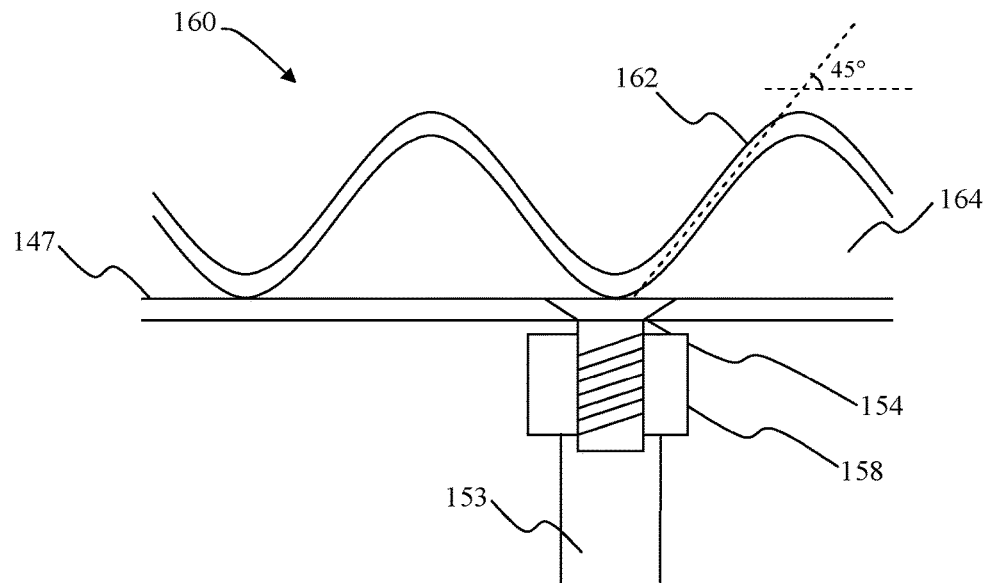
FIG. 4 illustrates a magnified longitudinal cross-sectional profile of a portion of the blade of FIG. 2.

FIG. 4 illustrates a magnified portion of a longitudinal cross-sectional profile of the surface of the blade of FIG. 2 along line A-A. Elongate receptor band 160 is shown to be affixed onto the windward surface 147 of the blade 140. The receptor band 160 comprises at least one crease 162 in the longitudinal profile. Crease 162 comprises a substantially sinusoidal dome shaped profile, and further has an ideal slope angle of about 45°. Further, the receptor band has a thickness of about 0.5 mm and the peak of crease 162 of the receptor band 160 has a height of about 1.5 mm.

In the present embodiment, the receptor band 160 comprises a corrugated longitudinal cross-sectional profile, and in particular, comprises a plurality of identical creases 162. The corrugated profile provides for further flexibility of the receptor band in coping with bending stresses, and allows for a more durable solution with an increased fatigue lifetime, as compared to a typical flat metal band for a similar purpose. In the embodiment, the receptor band 160 comprises a peak-to-peak distance between two creases of about 3.5 mm to 4 mm.

Figure 4A:
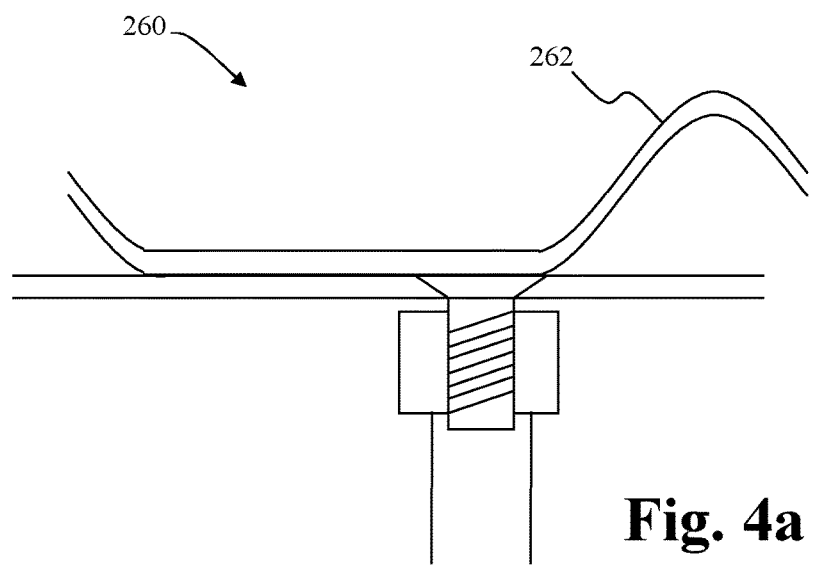
FIG. 4a illustrates a magnified longitudinal cross-sectional profile of a portion of the blade according to another embodiment.

FIG. 4a illustrates a receptor band according to another embodiment. Receptor band 260 comprises a plurality of creases 262 with a non-sinusoidal profile.

Figure 4B:
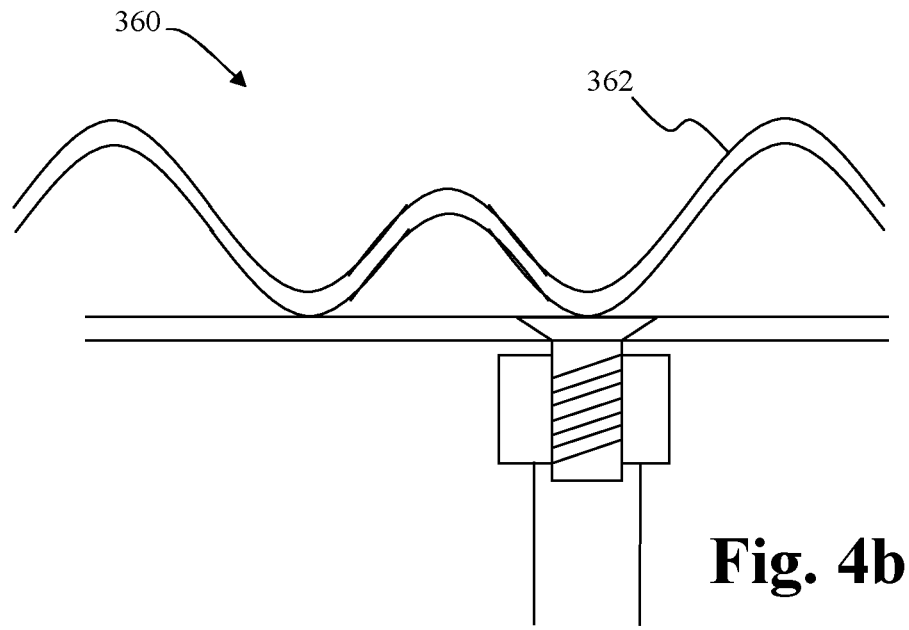
FIG. 4b illustrates a magnified longitudinal cross-sectional profile of a portion of the blade according to yet another embodiment.

FIG. 4b illustrates a receptor band according to yet another embodiment. Receptor band 360 comprises a plurality of non-identical creases 362 with varying heights. Such a combination produces an undulating longitudinal cross-sectional profile.

Figure 4C:
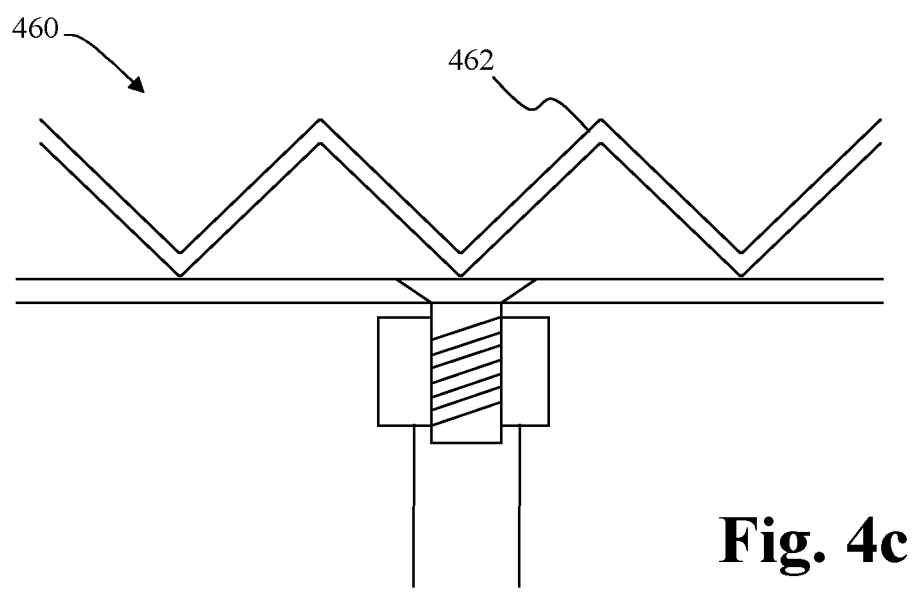
FIG. 4c illustrates a magnified longitudinal cross-sectional profile of a portion of the blade according to another embodiment.

FIG. 4c illustrates a receptor band according to another embodiment. Receptor band 460 comprises a plurality of identical triangular creases 462 with similar slopes and apexes.

Such a combination produces an accordion-shaped longitudinal cross-sectional profile. Other crease profiles of the receptor band are possible in other embodiments.

In the embodiment, the receptor band 160 is affixed to the surface 147 of the blade 140 by means of an adhesive, specifically glue. The glue 164 provides a seal between the receptor band 160 and the surface 147 of the blade 140 and keeps the receptor band 160 securely on the blade 140, and in particular, in physical and electrical contact with side receptor 154, 156. The glue 164 may be applied onto the receptor band by means of an adhesive double-sided mounting tape provided on the receptor band, or by any other means that is suitable to maintain the installation.

In an embodiment, installing a lightning protection system in a wind turbine blade, comprises the following:

Providing a lightning protection system in the wind turbine blade, comprising a lightning receptor module arranged on an external surface of the wind turbine blade and which is electrically coupled to a lightning conductor, the lightning conductor located along a longitudinal portion of the wind turbine blade and being coupled to an electrical ground;

Preparing a receptor band for application onto a wind turbine blade, and

Incorporating into the lightning protection system of the wind turbine blade.

In an example, a method of preparing a receptor band for application onto a wind turbine blade comprises the following:

Providing a corrugated copper strip for blade lightning protection

Providing a strip of expanded copper foil to be used in the receptor band.

Aligning the strip of copper foil to the corrugated copper strip by trimming.

Applying a layer of Primer with a thickness of 20-25 µm on the strip of copper foil.

Applying a layer of Primer with a thickness of 20-25 µm on the corrugated copper strip.

Preparing a sealing resin, such as a polyurethane adhesive, for application between the strip of copper foil and the corrugated copper strip.

Applying the sealing resin on the strip of copper foil and providing a layer of breather strips over the applied resin Applying another layer of sealing resin over the breather strips and applying the corrugated copper strip over.

Applying a layer of release film over and vacuum seal.

Curing the resin at room temperature for a period of 10 hours, to adhere the corrugated copper strip to the strip of expanded copper foil Demoulding the package after curing Removing the top release film ply to obtain resultant receptor band.

Providing a layer of adhesive, such as a double-sided adhesive mounting tape, onto the receptor band in preparation for the application onto a wind turbine blade.

In an example, a method of applying the receptor band onto the wind turbine blade comprises the following:

Prepare a surface of the wind turbine blade for the receptor band to be applied, by grinding, smoothing, and/or cleaning the surface.

Placing the receptor band onto the surface of the blade.

Holding the receptor band in place on the surface of the blade such that the through-hole in the receptor band is aligned with the receptor recess.

Applying a vacuum distribution net over the receptor band and creating a vacuum over the receptor band.

Attaching a heating blanket over the vacuum distribution net and applying heat to activate adhesive on the receptor band.

Removing the heating blanket and the vacuum distribution net

Applying a sealer to an edge of the receptor band, such as a urethane sealer.

In another example, a method of incorporating the receptor band into the lightning protection system of the blade comprises the following:

Removing a side receptor module from the surface of the blade prior to the mounting of the receptor band, to leave a recessed hole, i.e. a recess in the blade surface with a through hole, for fitting a receptor module.

Creating a through hole in the receptor band which aligns to the receptor recessed hole.

Mounting the receptor band onto the surface of the blade.

Mounting the side receptor module over the receptor band and into the receptor recessed hole, by means of a counter sink.

Such a method of incorporating allows for a secure mounting of the receptor band and further ensures physical and electrical connection between the receptor band and the lightning down conductor, via the side receptor.

In a further embodiment, the method further comprises trimming any protrusion from the side receptor module to reduce any aerodynamic impact. The protrusion occurs due to the side receptor module not being able to fully fit back into the receptor recessed hole due to the presence of the receptor band. Trimming the protrusion retains the smooth aerodynamic profile of the blade and reduces any drag which may be caused by such a protrusion.

In an embodiment, the receptor band is applied onto the surface of the wind turbine blade in a retrofit process. In other embodiments, the receptor band may be integrated into the blade production process. A layer of dirt resistive paint could also be painted over the receptor band. Although such paint may inherently be electrically non-conductive, the permeability of the paint layer is usually insufficiently high to prevent a dielectric breakdown of the paint layer which allows electrical transfer through the paint. Alternatively, a metallic paint is provided for the receptor band.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A wind turbine blade comprising a lightning protection system, the lightning protection system comprising:
    a lightning conductor located along a longitudinal portion of the wind turbine blade and being coupled to an electrical ground;

a lightning receptor module arranged on an external surface of the wind turbine blade and electrically coupled to the lightning conductor, and an elongate receptor band installed on the external surface of the wind turbine blade, over the lightning receptor module, the receptor band arranged to receive a stroke of lightning and transfer electrical current from the lightning stroke to the lightning conductor through the lightning receptor module;

wherein the elongate receptor band comprises a substantially uniform thickness and at least one crease in a longitudinal cross-sectional profile of the elongate receptor band, wherein the elongate receptor band comprises a corrugated longitudinal cross-sectional profile, wherein the elongate receptor band comprises upper and lower surfaces, and wherein the at least one crease is defined by at least one first apex in the upper surface and at least one second apex in the lower surface.

2. The wind turbine blade according to claim 1, wherein the elongate receptor band is installed on the external surface of the wind turbine by an adhesive.

3. The wind turbine blade according to claim 1, wherein the elongate receptor band comprises a metal.

4. The wind turbine blade according to claim 3, wherein the elongate receptor band comprises any one of: iron, stainless steel, aluminum, and copper.

5. The wind turbine blade according to claim 1, wherein the lightning receptor module is a discrete lightning receptor.

6. The wind turbine blade according to claim 1, where the lightning receptor module comprises two discrete lightning receptors, and wherein the elongate receptor band is installed over both the discrete lightning receptors.

7. The wind turbine blade according to claim 1, wherein the elongate receptor band is installed in a substantially longitudinal direction along the wind turbine blade.

8. A wind turbine comprising a wind turbine blade according to claim 1.

9. The wind turbine blade according to claim 1, wherein the elongate receptor band comprises an electrically conductive portion, and wherein the electrically conductive portion comprises the crease.

10. The wind turbine blade according to claim 9, wherein the electrically conductive portion is at least partially exposed.

11. The wind turbine blade according to claim 10, wherein a first surface of the electrically conductive portion contacts a surface of the wind turbine blade and wherein a second surface of the electrically conductive portion is exposed.

12. The wind turbine according to claim 1, wherein the crease includes upper and lower surfaces, and wherein the upper and lower surfaces have similar cross-sectional profiles.

13. The wind turbine according to claim 1, wherein the longitudinal cross-sectional profile of the elongate receptor band is parallel to a longitudinal cross-sectional profile of the wind turbine blade.

14. The wind turbine according to claim 1, wherein the at least one second apex contacts the lightning receptor module.

* * * * *